United States Patent [19]
Rockney et al.

[11] Patent Number: 5,660,899
[45] Date of Patent: Aug. 26, 1997

[54] CONVOLUTED HEAT-REFLECTIVE, PROTECTIVE SLEEVING

[75] Inventors: Douglas L. Rockney, Naperville; Brian H. Johnson, Chicago; Randall D. Jones, Oak Lawn, all of Ill.

[73] Assignee: Safe-T-Quip Corporation, Chicago, Ill.

[21] Appl. No.: 604,453

[22] Filed: Feb. 21, 1996

[51] Int. Cl.$^6$ ........................................... F16L 11/11
[52] U.S. Cl. ............... 428/34.7; 428/35.9; 428/36.2; 428/36.91; 428/34.5; 428/184; 428/213; 138/122; 138/143; 138/149; 138/173
[58] Field of Search ....................... 138/121, 122, 138/149, 125, 143, 173; 428/35.9, 36.9, 36.91, 182, 179, 36.2, 34.5, 184, 213, 220

[56] References Cited

U.S. PATENT DOCUMENTS

| | | | |
|---|---|---|---|
| 1,912,807 | 6/1933 | Venosta | 156/163 |
| 2,045,540 | 6/1936 | Debenedetti | 156/143 |
| 2,130,838 | 9/1938 | Brown | 156/204 |
| 3,186,438 | 6/1965 | Holmgren | 138/121 |
| 3,316,136 | 4/1967 | Pufahl | 156/160 |
| 3,540,489 | 11/1970 | Hanson | 138/121 |
| 3,599,677 | 8/1971 | O'Brien | 138/121 |
| 3,891,007 | 6/1975 | Kleykamp | 138/121 |
| 4,400,863 | 8/1983 | Schroeder | 138/121 |
| 4,509,559 | 4/1985 | Cheetham et al. | 138/122 |
| 4,688,603 | 8/1987 | Donnerhack et al. | 138/121 |
| 4,867,269 | 9/1989 | Lalikos et al. | 138/121 |
| 5,030,302 | 7/1991 | Jud et al. | 156/164 |
| 5,148,836 | 9/1992 | Lawrence | 138/121 |
| 5,182,147 | 1/1993 | Davis | 428/36.91 |
| 5,469,892 | 11/1995 | Noone et al. | 138/122 |

*Primary Examiner*—Rena Dye
*Attorney, Agent, or Firm*—Lockwood, Alex, Fitzgibbon & Cummings

[57] ABSTRACT

Heat-reflective and protective sleeving is provided which has both an interior and an exterior convoluted profile. The sleeving includes layers of polymeric material, insulative material and reflective material which is assembled together into the convoluted profiles. A method and apparatus are provided for manufacturing the convoluted sleeving by wrapping a fabric-backed foil over a convoluted polymeric tubing while pushing the laminate into the grooves and over the crests of the convoluted profile of the polymeric tubing. In the preferred arrangement which is shown, this procedure is facilitated by the use of a plurality of worm gears that rotate substantially in unison in order to pull the convoluted polymeric tubing through an area defined by the worm gears, while simultaneously forming the convolutions in the laminate at the same time that the laminate is engaged with the external convoluted surface of the polymeric tubing.

26 Claims, 5 Drawing Sheets

CONVOLUTED HEAT-REFLECTIVE, PROTECTIVE SLEEVING

BACKGROUND AND DESCRIPTION OF THE INVENTION

This invention generally relates to convoluted sleeving having heat-reflective, insulative and protective properties. More particularly, the invention relates to a convoluted assembly including a convoluted polymeric tubing to which is conformingly adhered a laminate of reflective foil with insulating fabric. The convoluted heat-reflective, protective sleeving assembly exhibits good lateral flexibility, typically being substantially the same as the lateral flexibility of the convoluted polymeric tubing alone. Manufacturing is preferably accomplished by wrapping the laminate of foil and fabric over the external convoluted tubing profile of the convoluted polymeric while simultaneously directing portions of the laminate into the grooves of the external convolute tubing profile such that the laminate closely engages both the crests and the grooves of the external convoluted tubing profile in order to accomplish the conforming overlying structure.

In the past, various approaches have been taken in order to provide protective tubular coverings for conduits, cables, lines, wire harnesses and other components needing shielding from either the elements or other components or equipment. Usually, these components are found under the hood or elsewhere in vehicles, particularly automobiles and trucks. Often, an important property required of these types of protective tubings is to provide shielding from heat as well as protection from abrasion and the like. Typical automotive uses are in connection with fuel, brake, hydraulic, coolant and air conditioning lines and wire harnesses. These components may be made of diverse materials such as metals, polymers, plastics or rubbers.

An exemplary existing tubing or sleeving product is an aluminized fiberglass fabric shaped into a tube and sewn along a longitudinal seam. Products of this type can offer generally adequate reflective thermal protection, but they are deficient in providing flexibility needed in order to unobtrusively follow bends and curves in the line or other component being protected by the tubing. Some applications require a longitudinally slit tubing; however, products such as sewn aluminized fiberglass fabric cannot be slit without unraveling. This lack of flexibility and inability to be slit that is characteristic of these types of prior approaches can be accommodated somewhat by utilizing tubings that have diameters which are well oversized from diameters which would otherwise be required to accommodate the size of the line or the like being protected. When sewn aluminized fiberglass fabric tubings are used, there is a tendency for the stitching at the ends of the seams to rip back, especially during extended and rough usage.

Another existing approach in providing sleeving products for these types of applications is the use of fiberglass braid. Fiberglass braid offers elevated temperature protection and good flexibility; however, the openness of the braided yarns allows thermal leakage, the ends of the braided yarn are prone to fraying, and this type of component cannot be longitudinally slit for those applications where the ends of the line or the like which is to be protected are obstructed and do not allow for sliding insertion onto the line or the like.

In accordance with the present invention, a sleeving is provided which has superior flexibility while still offering excellent reflective and thermal protection and while being of a construction that advantageously accommodates longitudinal slitting when needed. In addition, its construction enhances heat dissipation when in use.

SUMMARY OF THE INVENTION

It has been determined that these important advantages and properties are achieved with a tubing assembly that includes a pre-corrugated polymeric tubing having both an external corrugated profile and an internal corrugated profile. This external corrugated profile is closely covered, in a tight conforming manner, with a laminate of heat reflective foil and protective fabric. Typically, the laminate and the corrugated tubing are adhesively secured together generally along the alternating crests and grooves of the tubing external corrugation. Advantageously, the assembly is carried out by a manufacturing procedure which includes wrapping the laminate over the external convoluted profile of the tubing while simultaneously directing the laminate into the groove, such as by the use of a worm gear arrangement, such that the laminate closely engages both the crests and the grooves of the external convoluted profile of the polymeric tubing. The assembled sleeving exhibits the lateral flexibility which is characteristic of the convoluted polymeric tubing prior to assembly into the sleeving.

It is accordingly a general object of the present invention to provide an improved convoluted heat-reflective, protective sleeving.

Another object of this invention is to provide an improved convoluted sleeving assembly which provides heat-reflective and protective properties and which retains the lateral flexibility of the convoluted polymeric material tubing component of the sleeving assembly.

Another object of the present invention is to provide an improved protective cover for efficiently reflecting radiant heat in underhood or other vehicle applications, including use on fuel, brake, hydraulic, coolant and air conditioning lines and wiring harnesses.

Another object of the present invention is to provide an improved heat-reflective, protective sleeving that is convoluted along its length in order to provide advantageous flexibility and bendability, while being suitable for use as a closed tube or as a slit tube which can be opened to allow for longitudinal access to the part being protected.

Another object of the present invention is to provide an improved sleeving assembly which provides improved thermal resistance to heat flow.

Another object of the present invention is to provide an improved sleeving assembly which maintains a circumferential profile even when flexed to its maximum radius in order to thereby allow cooling air to circulate around the part being protected, even at bending locations.

Another object of this invention is to provide an improved sleeving suitable for vehicle uses or for other uses such as covering wiring or gas hoses in equipment such as welding robots, covering wiring of home appliances, in generator compartments of mobile homes, on motorcycles, in marine engine compartments, and the like.

Another object of the present invention is to provide an improved method and apparatus for manufacturing a convoluted assembly where one of the components of the assembly is convoluted and relatively rigid but bendable, and where another component of the assembly is flexible and is acted upon in order to be conformed in size and shape to the external convoluted profile of the more rigid component.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein.

DETAILED DESCRIPTION OF THE INVENTION

Figure 1:
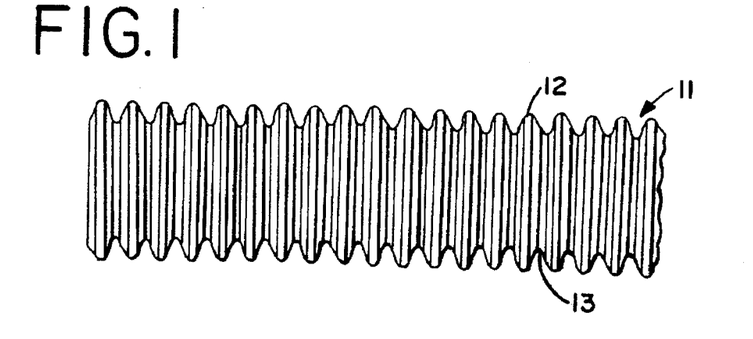
FIG. 1 is an elevational view of a convoluted heat-reflective, protective sleeving in accordance with the invention.

Convoluted sleeving in accordance with the present invention is generally designated as 11 in FIG. 1. Sleeving 11 includes a plurality of alternating external crests 12 and grooves 13. In this particular illustrated embodiment, each crest and groove is generally circular, and adjoining crests 12 are not spirally interconnected. The same is true, of course, for the plurality of grooves 13. While a spiral arrangement could be possible, the non-spiralling convoluted pattern that is illustrated provides a sleeving having a flexibility that is enhanced and more uniform than that of a spiralled configuration.

Figure 3:
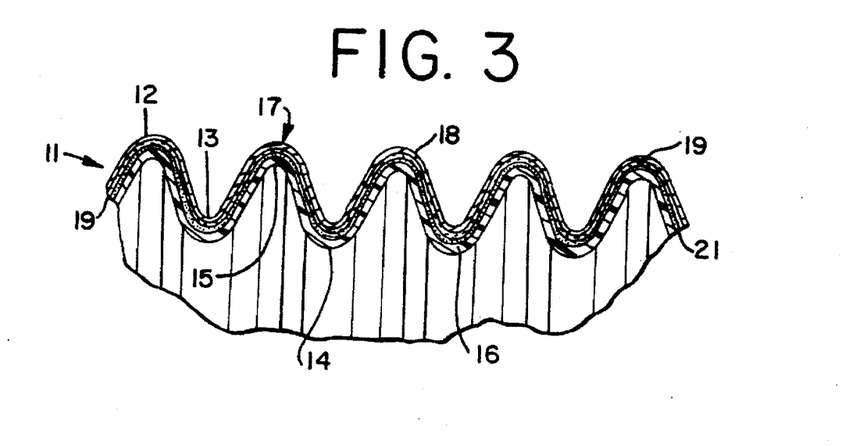
FIG. 3 is a cross-sectional view along line 3—3 of FIG. 2.
Figure 4:
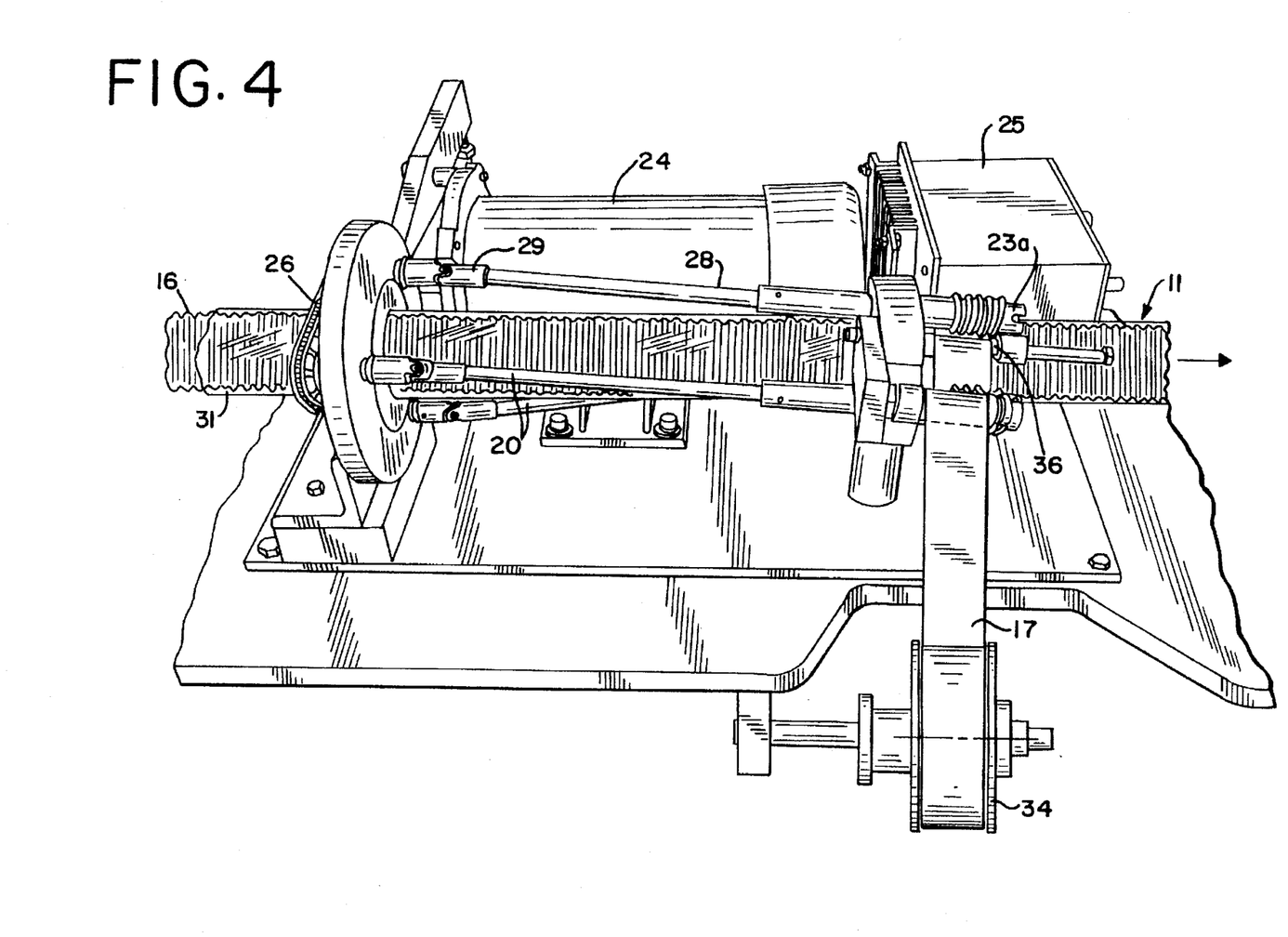
FIG. 4 is a perspective view illustrating an apparatus suitable for carrying out the manufacturing procedure which is generally schematically illustrated in FIG. 2.
Figure 5:
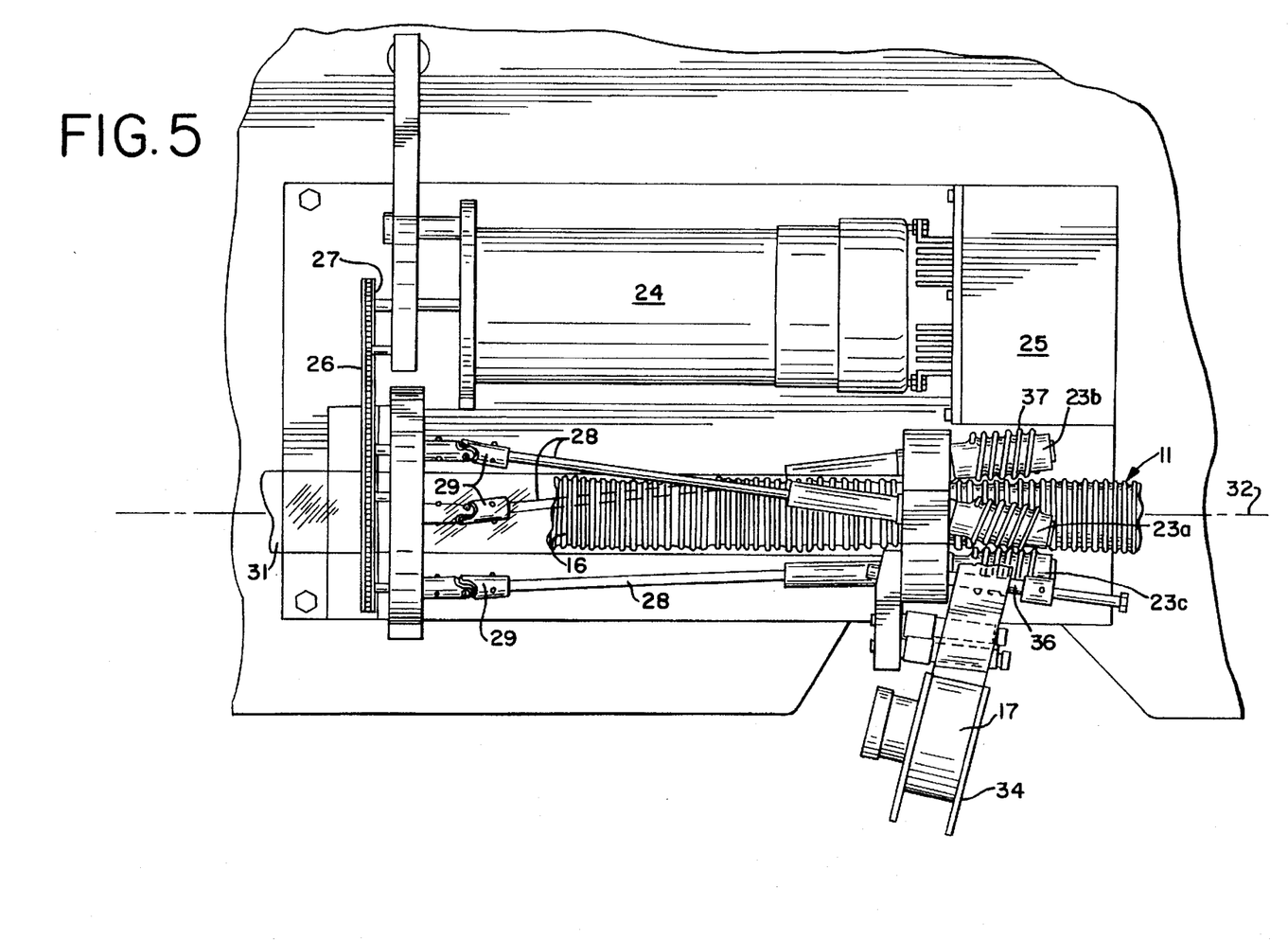
FIG. 5 is a top plan view of the apparatus illustrated in FIG. 4.
Figure 6:
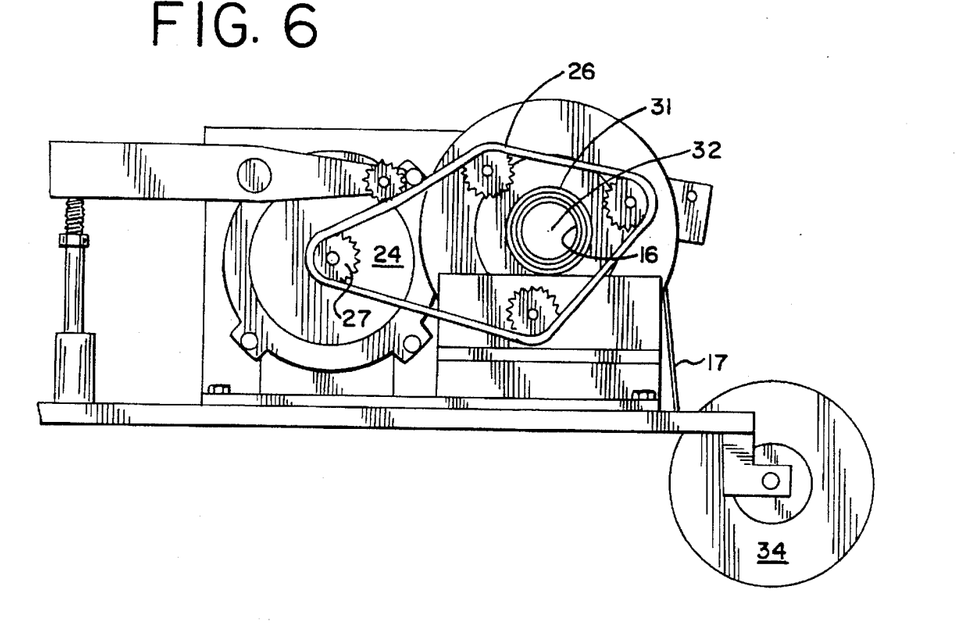
FIG. 6 is a rear end view of the apparatus illustrated in FIG. 4.

As is apparent from FIG. 3, the sleeving assembly has an internal convoluted surface as well as the external convoluted surface apparent in FIG. 1. More particularly, the internal convoluted surface includes internal crests 14 and internal grooves 15, alternating with each other in substantially the same manner as the external crests 12 and external grooves 13 alternate with respect to each other. The basic convoluted configuration of the sleeving assembly is provided by initially corrugated polymeric tubing 16. In essence, the remainder of the sleeving assembly 11 owes its shape and mechanical properties to this corrugated polymeric tubing 16. This tubing 16 provides the mechanical attributes of the tubing, including flexibility and bendability, which attributes are imparted primarily by this pre-corrugated polymer tubing 16. Generally Speaking, the remainder of the tubing assembly 11 thus functions, in a mechanical sense, as a skin over the skeleton provided by the corrugated polymer tubing 16.

With more particular reference to this skin, it has properties which allow it to be closely configured over and with respect to the external crests and grooves of the pre-corrugated polymer tubing 16. The preferred, illustrated overlayer or skin in this regard is a laminate, generally identified as 17. The laminate is composed of a metallic outer layer 18 laminated with an insulating layer 19, typically a fabric. In the preferred embodiment, this laminate 17 is secured to the external convoluted surface of the tubing 16 through the use of an adhesive 21 or the like. With this arrangement, the metallic outer layer 18 is secured in close conformity of shape and size to the convoluted tubing. This securement is through the insulating layer which enhances the toughness and heat resistance properties of the sleeving assembly 11.

With more particular reference to the components of the corrugated sleeving assembly, the tubing 16 is, prior to the formation of the assembly, a corrugated polymeric component. The corrugation forming procedure can be selected among those which are currently available, including vacuum forming and blow molding; however, in those instances where precision in convolute formation is required, vacuum processing in order to form the corrugations of the corrugated polymeric tubing 16 has been found to be especially suitable. The polymeric material should possess adequate heat resistance so that it will not deform, flow or melt during long-term exposure to underhood heat conditions, while avoiding cracking or excessive brittleness during typical low-temperature environmental conditions. Examples of materials that can possess these properties are nylons, polyamides, certain polyolefins, and the like. Specific examples of these polymers are nylon 6, nylon 6.6, polyethylene and polypropylene.

In typical applications, the outer diameter of the corrugated polymeric tubing 16 will range between about 0.375 inch (about 9.5 mm) and about 2 inches (about 50 mm). Wall thicknesses will vary somewhat with the diameter sizes. In order to maintain proper bendability of the convoluted tubing, the wall thickness of the tubing should vary in a generally proportional manner with the tubing diameter. Wall thicknesses can vary from between about 0.01 inch (about 0.25 mm) and about 0.03 inch (about 0.76 mm). For example, tubing having an inner diameter of 18 mm (measure at its internal crests 14), will have a wall thickness on the order of about 0.012 inch (approximately 0.3 mm), while a corrugated tubing having an inner diameter (at the internal crests) of about 1.25 inches (about 32 mm) will have a wall thickness of about 0.02 inch (about 0.5 mm). This wall thickness should not, of course, be so thin as to permit the convoluted tubing assembly to be easily crushed.

With reference to the metallic outer layer 18 of the laminate 17, it is generally preferred that this material be an actual metal foil. It has been found that most metallization procedures leave a deposit that has reflectivity properties which are less advantageous than those of a true foil. The preferred metallic outer layer 18 is aluminum foil. Typical thicknesses range between about 0.0005 inch (about 0.01 mm) and about 0.002 inch (about 0.05 mm), preferred foil thicknesses being between about 0.0006 inch (about 0.015 mm) and about 0.001 inch (about 0.025 mm).

The insulating layer 19 should be lightweight, strong and tough. A primary function of the insulating layer is to impart integrity to the foil layer while enhancing adhesive performance and application characteristics. The insulating layer should also assist in prevent ripping of the foil layer while also providing insulating and enhanced heat resistance properties to the laminate 17. While materials such as polyethylene terephthalate and other polymers available in sheet form can have some suitable properties, advantageous insulative properties might require the inclusion of other components such as fillers. An especially suitable material for the insulating layer 19, which has been found to possess these desired properties, is a fabric, an especially preferred fabric being woven fiberglass. Typical fabric layer thickness will be between about 0.001 inch (about 0.025 mm) and about 0.0035 inch (about 0.09 mm), preferred thicknesses being between approximately 0.0015 inch (about 0.038 mm) and approximately 0.0025 inch (about 0.064 mm).

The metallic outer layer 18 and the insulating layer 19 are laminated together in accordance with generally known procedures. Typically, the laminate is a fabric-backed foil. When the preferred materials are used, the laminate 17 is a fiberglass-backed aluminum foil, or an aluminized fiberglass laminate or fabric. Typical thicknesses of this laminate will be between about 0.002 inch (0.05 mm) and about 0.003 inch (about 0.08 mm).

Figure 2:
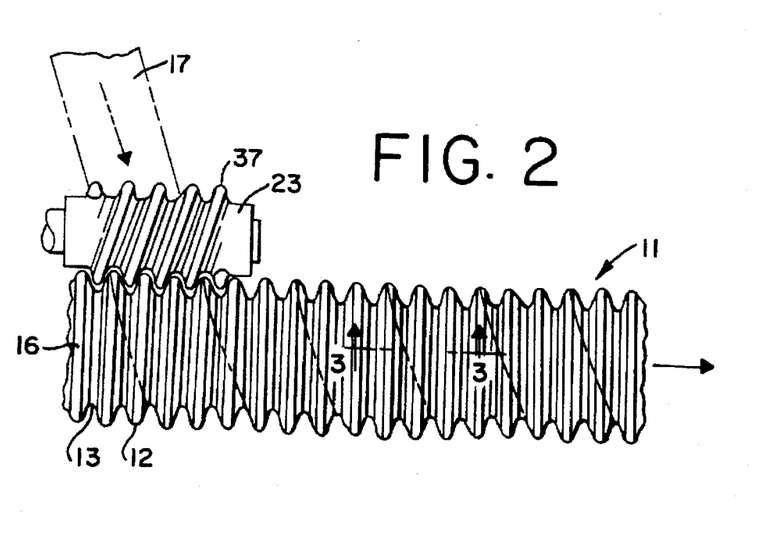
FIG. 2 is a somewhat schematic illustration of the preferred technique for assembling the convoluted sleeving.

FIG. 2 schematically illustrates the currently preferred approach for forming the convoluted sleeving assembly 11. The laminate 17 is provided in the form of a continuous web of laminate in strip form. This laminate is wrapped around the corrugated polymeric tubing 16 in a generally spiral fashion such that the metallic outer layer presents the outer surface of the formed sleeving assembly 11. This assembly procedure includes the use of one or more worm gears 23 to force the laminate 17 fully into the grooves 13 while wrapping alternating portions of the laminate (those portions between the grooves 13 during the assembly procedure) around the crests 12 in order to form the conforming and closely fitting structure shown in FIG. 3. It has been found to be especially advantageous and efficient to have the spiralling worm gear 23 effect rotation of the corrugated tubing so that it moves in the downstream direction as generally shown by the arrowhead in FIG. 2. At the same time, the rotating worm gear engages the web of laminate 17 and directs it into the grooves 13 and over the crests 12 as generally discussed herein.

A preferred apparatus which can be used to carry out the illustrated assembly method is depicted in FIGS. 4, 5, 6 and 7. In this illustrated embodiment, three worm gears 23a, 23b, 23c support the convoluted polymeric tubing 16 and simultaneously pull this tubing through the worm gears and through the apparatus while at the same time positioning the web of laminate 17 within the grooves of the convoluted tubing as generally discussed herein. The number of worm gears can be varied. For example, all but one of the worm gears could be replaced by other supporting means, in which event, the laminate positioning will be achieved by the remaining worm gear(s). Such other supporting means can be cylindrical rollers, or belts, or conveyor drives, for example.

Rotation of the worm gears can be achieved through any suitable driving mechanism that affords responsive control of speed and drive angles. The other supporting means could be driven as well, as needed. In the illustrated arrangement, a gear motor 24 is controlled by a variable speed control mechanism 25 which can be operator controlled by a foot switch (not shown) or the like. A chain drive assembly 26 is illustrated in driven engagement with gear 27 of the motor. Chain drive assembly 26 drivingly engages a plurality of shafts 28, typically through a universal joint assembly 29. Each shaft 28, and thus each worm gear is driven at substantially the same rotational speed.

In the illustrated manufacturing operation, a length of convoluted polymeric tubing (for example about 25 feet in length) is fed into and through a tube 31 which is longitudinally aligned with the worm gears or the like. More specifically, the longitudinal axis of the tube 31, and thus generally of the convoluted polymer tubing 16, is substantially coincident with an axis 32 from which each worm gear 23a, 23b, 23c is generally equally spaced. It will be appreciated that the tube 31 supports the convoluted polymeric tubing 16 upstream of the area at which the laminate web or strip is assembled onto the convoluted tubing. A similar tubing support arrangement (not shown) could be located downstream of this area in order to provide support for the convoluted sleeving assembly 11, or the sleeving assembly can be otherwise handled as desired.

When the convoluted polymeric tubing 16 comes into contact with the rotating worm gears in the illustrated apparatus, the convoluted tubing also rotates and is pulled through the worm gears. At this time, the aluminized fiberglass fabric laminate strip 17 is introduced into the worm gears and is applied to the convolute as shown. Generally speaking, the initially engaged worm gear 23a can effect the bulk of the formation of the convolutes into the laminate strip 17 as it is spiralled around the tubing.

Preferably, an adhesive is used to bond the tubing and the laminate together. In the event that a heat-sensitive adhesive is used, a heat source, such as a ring heater (not shown) can be positioned at a downstream location. Once assembly has been completed, the formed convoluted sleeving assembly 11 can be cut to desired lengths. Additionally, should there be a desire to include a longitudinal slit in the length of convoluted sleeving assembly, this can be accomplished by suitable equipment (not shown) which is available in the art.

Referring more specifically to the adhesive application, adhesive 21 (FIG. 3) can take the form of a pressure-sensitive adhesive. In that case, the adhesive is present on the fabric layer 19. In order to avoid premature adherence, a release paper strip 33 overlies the adhesive, such as when the laminate 17 is wound on a spool 34 as shown. A take-away roller 35, shown in association with rollers 38, 39 in FIG. 7, assists in separating the release paper strip 33 prior to application of the laminate 17 onto the convoluted tubing 16.

The adhesive could also be a material which can take the form of a heat-activated adhesive preapplied to the laminate 17. In this instance of a preapplied adhesive that is not pressure-sensitive, no release paper would be required.

Use of the adhesive advantageously avoids unraveling of the assembly, such as during transverse cutting or longitudinal slitting. When the pressure-sensitive adhesive, such as an acrylic-based adhesive, is presented as a ribbon as illustrated, its thickness, without accounting for the thickness of the silicone release paper, is on the order of about 0.002 inch (approximately 0.05 mm).

Figure 7:
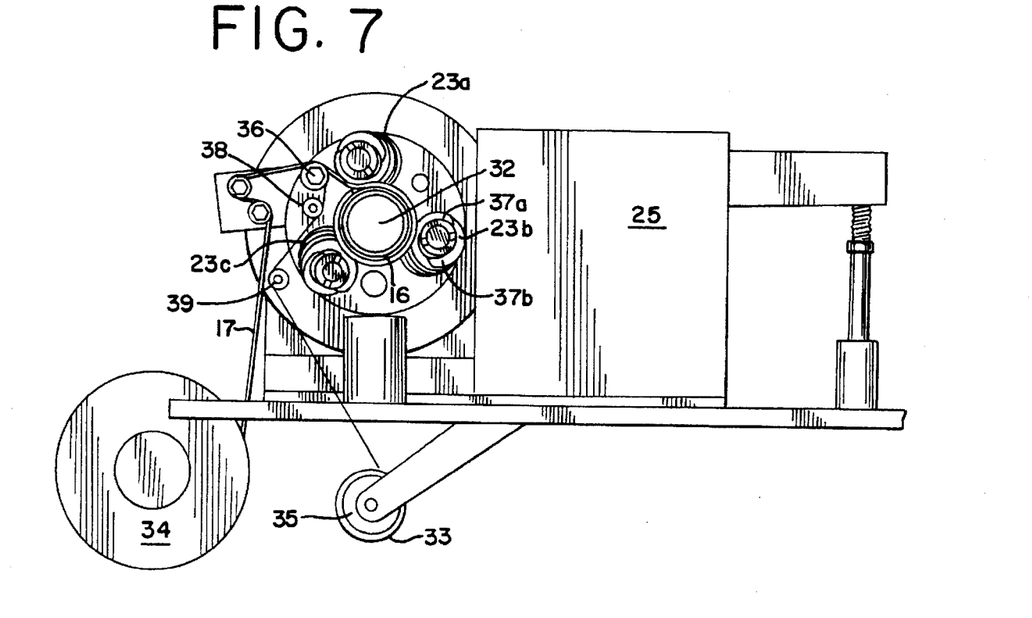
FIG. 7 is a front end view of the apparatus illustrated in FIG 4.

Each worm gear is oriented at a predetermined angle with respect to the axis 32 so that its flutes 37 enter the grooves and push alternating portions of the laminate strip toward, and preferably fully to the bottom of, the respective grooves until the laminate engages the tubing, typically through the adhesive. Worm gear flutes 37 generally conform in size to the profile defined by the external crests 12 and grooves 13 of the convoluted polymeric tubing. In a preferred arrangement, the worm gear(s) will have double-cut flutes 37a, 37b (FIG. 7). This permits an approximate doubling of the feed speed because two grooves 13 are entered at the same time by a single worm gear.

The width of the laminate strip 17 that is positioned and corrugated in-situ by the apparatus according to the invention will generally approximate the length of the working portion of the worm gear. It is important that, when applied, the laminate ribbon lengths overlap with each other so that no polymeric tubing is exposed. However, the overlap should not be so wide as to interfere with the convolute formation or be too bulky so as to interfere with the flexibility of the convoluted tubing assembly which is formed. The width of the laminate strip or ribbon should not be too wide so that it will span too many Crests and grooves so as to rip or not extend fully into the grooves. Generally speaking, the width of the ribbon will be narrower for a smaller diameter convoluted tubing and will be wider for larger diameter convoluted tubing. Laminate ribbon widths can range between about 1 inch and about 2 inches (about 25 mm to about 50 mm). For a convoluted tubing having an inner diameter of 18 mm, the ribbon width would be on the order of about 30 to about 36 mm, while for a convoluted tubing having inner diameter of about 32 mm, the laminate ribbon width can be between about 40 mm and about 45 mm. These are examples of suitable values; it will be appreciated that same will vary also according to the profile of the convolute, including the depth and amplitude of the crests.

Figure 8:
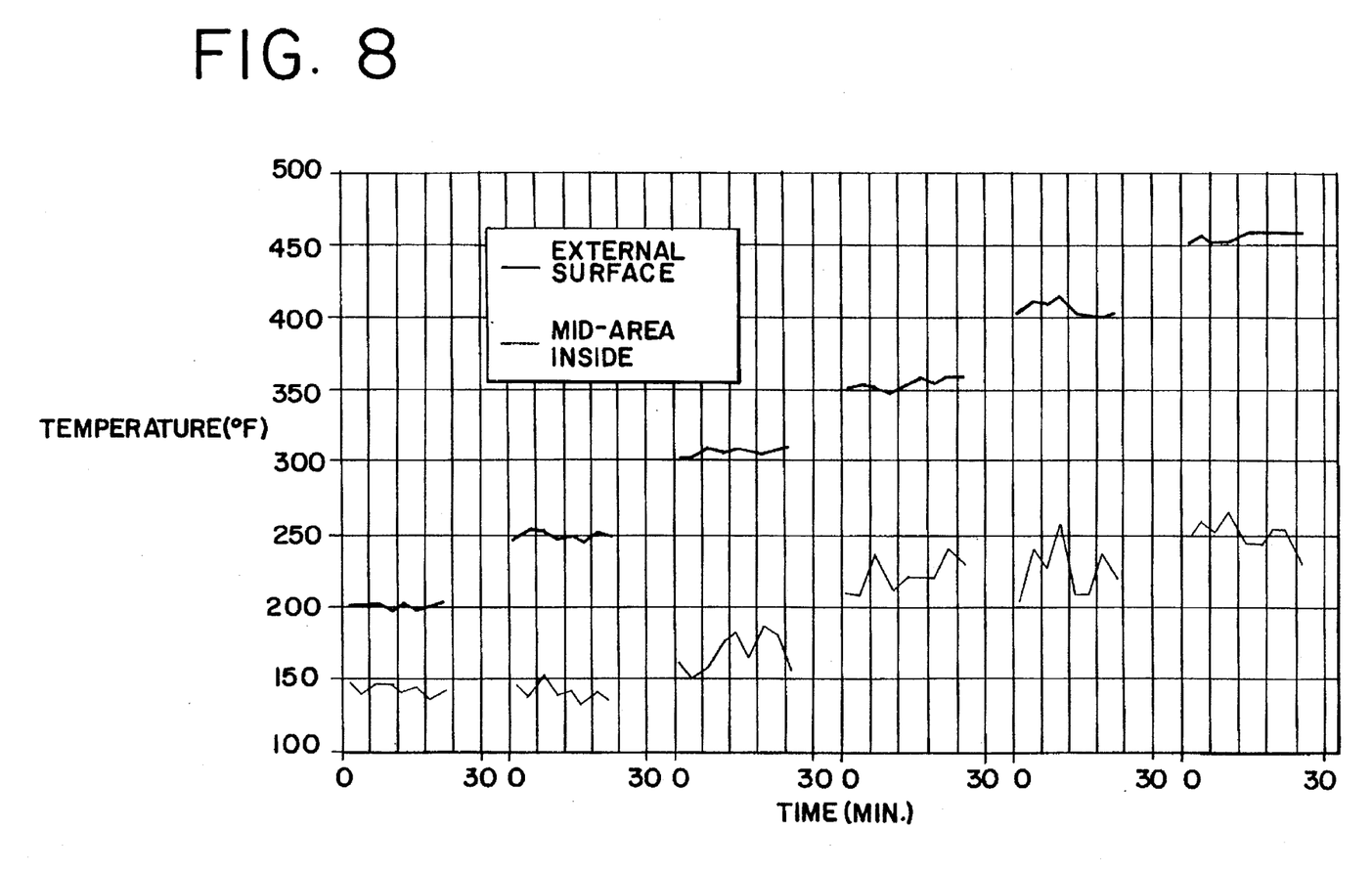
FIG. 8 is a plot of data to illustrate thermal resistance to heat flow of the convoluted sleeving according to the invention.

FIG. 8 illustrates an important advantage of the convoluted sleeving assembly according to the invention in its ability to reflect radiant heat, such as in underhood or other vehicle types of applications. Generally speaking, these vehicle applications require a temperature reading range of between −40° F. and 500° F. (−40° C. to 260° C.). Because of the fully convoluted structure and relative sizing of component materials, the sleeving assembly according to the invention maintains a rounded cross-sectional shape even when bent or flexed to its maximum radius. This allows cool air to circulate around the part being protected, whether along a straight or curved pathway. This enhances the efficiency of the convoluted sleeving assembly in providing thermal protection. Included in this important advantage is the fact that the aluminized fiberglass fabric covering offers heat reflection as well as insulation. The smooth aluminum surface also resists abrasion, chemical attack and condensation.

The data reported in FIG. 8 are those developed during testing which was set up to measure thermal resistance to external heat flow in increasing temperatures ranging from 200° to 450° F. (93.3° to 230.2° C.) for test periods of 21 to 30 minutes. Air circulated in the area surrounding the test was at room temperature. Thermocouples were attached both to the external surface and to the mid-area inside of the part being tested. Test readings were taken at three-minute intervals. As is evident from FIG. 8, the inner temperature was always substantially lower than the outer, surface temperature. The average reduction in this regard calculates as 43%. The results of FIG. 8 can be summarized by observing that, when subjected to an external temperature of 250° F., the inner temperature was only 141° F. When subjected to 300° F., the inner temperature was only 168° F. When subjected to 350° F., the inner temperature was only 210° F. When subjected to 400°0 F., the inner temperature was only 225° F., and when subjected to 450° F., the inner temperature was only 252° F.

It will be understood that the embodiments of the present invention which have been described are illustrative of some of the applications of the principles of the present invention. Various modifications may be made by those skilled in the art without departing from the true spirit and scope of the invention.

We claim:

1. Convoluted heat-reflective and protective sleeving for use in elevated-temperature environments, comprising:

a length of tubing made of a polymeric material and provided with a convoluted profile which imparts lateral flexibility to said polymeric tubing, said convoluted profile being both an internal convoluted profile and an external convoluted profile;

a convoluted oversleeve laminate secured to said external convoluted profile of the polymeric tubing such that said oversleeve laminate has both an internal convoluted profile and an external convoluted profile, said internal convoluted profile of said convoluted oversleeve laminate engages said external convoluted profile of the polymeric tubing so as to have a convoluted size and shape which substantially conforms to the size and shape of said external convoluted profile of the polymeric tubing, said oversleeve laminate substantially assuming the lateral flexibility of the convoluted polymeric tubing without substantially detracting from said lateral flexibility; and said convoluted oversleeve laminate is a lamination of a metallic reflective layer with an insulative fabric layer, and said metallic reflective layer defines said external convoluted profile of the oversleeve laminate and provides an external-most surface of the convoluted heat-reflective and protective sleeving.

2. The sleeving in accordance with claim 1, wherein said reflective layer is a metal foil layer.

3. The sleeving in accordance with claim 1, wherein said insulative layer is woven fiberglass fabric.

4. The sleeving in accordance with claim 1, wherein said convoluted oversleeve laminate is an aluminized fiberglass.

5. The sleeving in accordance with claim 1, wherein said convoluted polymeric tubing is a nylon material.

6. The sleeving in accordance with claim 1, wherein said convoluted polymeric tubing has alternating external crests and grooves and complementary alternating internal crests and grooves substantially along its length, wherein said convoluted profile of the oversleeve laminate has internal crests which engage said external grooves of the polymeric tubing, and wherein said convoluted profile of the oversleeve laminate has internal grooves which engage said external crests of the polymeric tubing.

7. The sleeving in accordance with claim 1, further including an adhesive layer between said convoluted oversleeve laminate and said convoluted polymeric tubing, and wherein said convoluted oversleeve laminate is secured to said external convoluted profile of the polymeric tubing by said adhesive layer.

8. The sleeving in accordance with claim 1, wherein said convoluted profiles are non-spiraled profiles.

9. The sleeving in accordance with claim 1, wherein said sleeving has a temperature rating ranging from −40° F. to 500° F.

10. The sleeving in accordance with claim 1, wherein said convoluted oversleeve laminate is a spirally wrapped web having overlapping edges.

11. The sleeving in accordance with claim 10, wherein said web has a width of between about 25 mm and about 50 mm.

12. The sleeving in accordance with claim 1, wherein said polymeric tubing has a wall thickness of between about 0.25 mm and about 0.76 mm, and wherein said oversleeve laminate has a wall thickness of between about 0.05 mm and about 0.08 mm.

13. Convoluted heat-reflective and protective sleeving for use in elevated-temperature environments, comprising:

a length of tubing made of a polymeric material and provided with a convoluted profile which imparts lateral flexibility to said polymeric tubing, said convoluted profile being both an internal convoluted profile and an external convoluted profile;

a convoluted oversleeve laminate secured to said external convoluted profile of the polymeric tubing such that said oversleeve laminate has a convoluted size and shape which substantially conforms to the size and shape of said external convoluted profile of the polymeric tubing, said oversleeve laminate substantially assuming the lateral flexibility of the convoluted polymeric tubing without substantially detracting from said lateral flexibility;

said convoluted oversleeve laminate is a lamination of a reflective layer with an insulative fabric layer, and said reflective layer defines an external-most surface of the convoluted heat-reflective and protective sleeving; and a longitudinal slit is included through both said laminate and said tubing.

14. The sleeving in accordance with claim 13, wherein said reflective layer is a metal foil layer.

15. The sleeving in accordance with claim 13, wherein said insulative layer is woven fiberglass fabric.

16. The sleeving in accordance with claim 13, wherein said convoluted oversleeve laminate is an aluminized fiberglass.

17. The sleeving in accordance with claim 13, wherein said convoluted polymeric tubing is a nylon material.

18. The sleeving in accordance with claim 13, wherein said convoluted polymeric tubing has alternating external crests and grooves and complementary alternating internal crests and grooves substantially along its length, wherein said convoluted profile of the oversleeve laminate has internal crests which engage said external grooves of the polymeric tubing, and wherein said convoluted profile of the oversleeve laminate has internal grooves which engage said external crests of the polymeric tubing.

19. The sleeving in accordance with claim 13, further including an adhesive layer between said convoluted oversleeve laminate and said convoluted polymeric tubing, and wherein said convoluted oversleeve laminate is secured to said external convoluted profile of the polymeric tubing by said adhesive layer.

20. The sleeving in accordance with claim 13, wherein said convoluted profiles are non-spiraled profiles.

21. The sleeving in accordance with claim 13, wherein said sleeving has a temperature rating ranging from −40° F. to 500° F.

22. The sleeving in accordance with claim 13, wherein said convoluted oversleeve laminate is a spirally wrapped web having overlapping edges.

23. The sleeving in accordance with claim 22, wherein said web has a width of between about 25 mm and about 50 mm.

24. The sleeving in accordance with claim 13, wherein said polymeric tubing has a wall thickness of between about 0.25 mm and about 0.76 mm, and wherein said oversleeve laminate has a wall thickness of between about 0.05 mm and about 0.08 mm.

25. Convoluted heat-reflective and protective sleeving for use in elevated-temperature environments, comprising:

a length of tubing made of a polymeric material which is a nylon material, said length of tubing having a convoluted profile which imparts lateral flexibility to said polymeric tubing, said convoluted profile being both an internal convoluted profile and an external convoluted profile;

a convoluted oversleeve laminate secured to said external convoluted profile of the polymeric tubing such that said oversleeve laminate has a convoluted size and shape which substantially conforms to the size and shape of said external convoluted profile of the polymeric tubing, said oversleeve laminate substantially assuming the lateral flexibility of the convoluted polymeric tubing without substantially detracting from said lateral flexibility; and said convoluted oversleeve laminate is a lamination of a reflective layer with an insulative fabric layer, said reflective layer defines an external-most surface of the convoluted heat-reflective and protective sleeving, and said reflective layer is metal foil layer.

26. Convoluted heat-reflective and protective sleeving for use in elevated-temperature environments, comprising:

a length of tubing made of a polymeric material and provided with a convoluted profile which imparts lateral flexibility to said polymeric tubing, said convoluted profile being both an internal convoluted profile and an external convoluted profile;

a convoluted oversleeve laminate secured to said external convoluted profile of the polymeric tubing such that said oversleeve laminate has a convoluted size and shape which substantially conforms to the size and shape of said external convoluted profile of the polymeric tubing, said oversleeve laminate substantially assuming the lateral flexibility of the convoluted polymeric tubing without substantially detracting from said lateral flexibility;

said convoluted oversleeve laminate is a lamination of a reflective layer with an insulative fabric layer, said reflective layer defines an external-most surface of the convoluted heat-reflective and protective sleeving, and said reflective layer is a metal foil layer; and an adhesive layer, said adhesive layer being between said convoluted oversleeve laminate and said convoluted polymeric tubing, and said convoluted oversleeve laminate is secured to said external convoluted profile of the polymeric tubing by said adhesive layer.

\* \* \* \* \*

UNITED STATES PATENT AND TRADEMARK OFFICE
CERTIFICATE OF CORRECTION

PATENT NO.   : 5,660,899
DATED        : August 26, 1997
INVENTOR(S)  : Douglas L. Rockney, Brian H. Johnson and Randall D. Jones It is certified that error appears in the above-indentified patent and that said Letters Patent is hereby corrected as shown below:

Col. 3, line 15, "along line" should read --along the line--;
    line 59, delete "Speaking" and insert --speaking--.
Col. 4, line 60, "prevent ripping" should read --preventing ripping--.
Col. 7, line 5, delete "Crests" and insert --crests--; line 53,
    "400°0 F." should read --400° F.--.

Signed and Sealed this

Third Day of March, 1998

Attest:

Attesting Officer

BRUCE LEHMAN

Commissioner of Patents and Trademarks